US012658704B2

(12) United States Patent
Locher et al.

(10) Patent No.: US 12,658,704 B2
(45) Date of Patent: Jun. 16, 2026

(54) DISTRIBUTED LEDGER FOR TRANSACTING WITH GRID CONSTRAINTS TO ENSURE GRID STABILITY

(71) Applicant: Hitachi Energy Ltd, Zürich (CH)

(72) Inventors: Thomas Locher, Zürich (CH);
Yvonne-Anne Pignolet, Zürich (CH);
Alexandre Oudalov, Fislisbach (CH);
Sebastian Obermeier, Rietheim (CH)

(73) Assignee: HITACHI ENERGY LTD, Zürich (CH)

( * ) Notice: Subject to any disclaimer, the term of this patent is extended or adjusted under 35 U.S.C. 154(b) by 891 days.

(21) Appl. No.: 17/622,003

(22) PCT Filed: Jun. 27, 2020

(86) PCT No.: PCT/EP2020/068175
§ 371 (c)(1),
(2) Date: Dec. 22, 2021

(87) PCT Pub. No.: WO2020/260676
PCT Pub. Date: Dec. 30, 2020

(65) Prior Publication Data
US 2022/0271535 A1     Aug. 25, 2022

(30) Foreign Application Priority Data
Jun. 28, 2019     (EP) .................................... 19183219

(51) Int. Cl.
*H02J 3/17*          (2026.01)
*H02J 3/00*          (2026.01)
*H04L 9/00*          (2022.01)

(52) U.S. Cl.
CPC ................ *H02J 3/17* (2026.01); *H02J 3/003* (2020.01); *H02J 3/004* (2020.01); *H04L 9/50* (2022.05)

(58) Field of Classification Search
CPC ........ G06Q 50/06; G06Q 10/04; G06Q 40/04; G06Q 20/389; G06Q 30/06; Y04S 10/50;
(Continued)

(56) References Cited

U.S. PATENT DOCUMENTS

| | | | | |
|---|---|---|---|---|
| 9,035,479 B1 * | 5/2015 | Gates | ..................... | G06Q 50/06 |
| | | | | 290/43 |
| 2017/0104344 A1 * | 4/2017 | Wenzel | .................. | G06Q 50/06 |

(Continued)

FOREIGN PATENT DOCUMENTS

| | | |
|---|---|---|
| CN | 106026178 A | 10/2016 |
| CN | 106530041 A | 3/2017 |

(Continued)

OTHER PUBLICATIONS

Danzi et al., "Distributed proportional-fairness control in microgrids via blockchain smart contracts," 2017 IEEE International Conference on Smart Grid Communications, 2017, pp. 45-51; retrieved from https://ieeexplore.ieee.org/stamp/stamp.jsp?tp=&arnumber=8340713 (Year: 2017).*

(Continued)

*Primary Examiner* — Shannon S Campbell
*Assistant Examiner* — Bryan J Kirk
(74) *Attorney, Agent, or Firm* — PROCOPIO, CORY, HARGREAVES & SAVITCH LLP

(57) ABSTRACT

A for ensuring grid stability by using a distributed ledger, the method comprising the steps: measuring metrics from a plurality of distributed energy resource, DER, wherein said metrics are related to grid stability; storing (a) said metrics/measurements in the distributed ledger; transferring said metrics from the distributed ledger into a smart contract (2); computing any deviations between said metrics and predetermined values stored in advance in the smart contract (2) by executing the smart contract; transferring and storing
(Continued)

results from the computing step in the distributed ledger; and transferring said results from the distributed ledger to the respective DER of the plurality of DERs, wherein said DER receives positive or negative values which regulates the amount of contribution to the grid.

16 Claims, 2 Drawing Sheets

(58) Field of Classification Search
CPC ........ Y04S 20/222; Y04S 50/10; Y04S 10/12; Y04S 20/221; Y04S 10/30; Y04S 20/30; Y04S 40/12; Y04S 50/12; Y04S 40/20; Y04S 50/14; Y04S 50/00; Y04S 40/18; Y04S 40/00; Y04S 50/16; Y04S 10/123; Y02B 70/3225; Y02B 90/20; Y02B 10/10; Y02B 10/30; Y02B 30/70; Y02B 10/70; Y02B 10/20; Y02B 70/30; H02J 3/381; H02J 3/008; H02J 3/003; H02J 3/004; H02J 3/38; H02J 13/00034; H02J 13/00002; H02J 2300/20; H02J 3/14; H02J 3/28; H02J 2300/40; G05B 15/02; G05B 2219/2639; G05B 13/02; G05B 19/02; H04L 67/12; H04L 67/104; H04L 47/83; H04L 12/14; H04L 41/0833
See application file for complete search history.

(56) References Cited

U.S. PATENT DOCUMENTS

| | | | | |
|---|---|---|---|---|
| 2018/0130130 A1* | 5/2018 | Dechu | .................... | G06Q 50/06 |
| 2019/0172159 A1* | 6/2019 | Sun | ...................... | G06Q 30/018 |
| 2019/0288513 A1* | 9/2019 | Nakayama | ............. | G06Q 10/04 |
| 2021/0098988 A1* | 4/2021 | Gokhale | ................. | H02J 3/381 |

FOREIGN PATENT DOCUMENTS

| | | |
|---|---|---|
| CN | 109066690 A | 12/2018 |
| CN | 109524962 A | 3/2019 |
| WO | 2018/050222 A1 | 3/2018 |

OTHER PUBLICATIONS

International Search Report and Written Opinion of the International Searching Authority for related PCT application No. PCT/EP2020/068175 dated Oct. 15, 2020, 14 pages.
Wang et al., Energy Crowdsourcing and Peer-to-Peer Energy Trading in Blockchain-Enabled Smart Grids, Jan. 3, 2019, arxiv.org, Cornell University Library, 201 Olin library Cornell University Ithaca, NY 14853, XP081012592, 12 pages.

* cited by examiner

DISTRIBUTED LEDGER FOR TRANSACTING WITH GRID CONSTRAINTS TO ENSURE GRID STABILITY

CROSS-REFERENCE TO RELATED APPLICATIONS

The present application is a national stage entry of International Patent App. No. PCT/EP2020/068175, filed on Jun. 27, 2020, which claims priority to European App. No. 19183219.5, filed on Jun. 28, 2019, which are both hereby incorporated herein by reference as if set forth in full.

FIELD OF THE INVENTION

The present disclosure relates to methods, devices and systems for enhancing grid stability. In particular, embodiments provide methods and systems by using a distributed ledger for transacting with grid constraints in order to ensure grid stability.

BACKGROUND OF THE INVENTION

Power production and consumption must be balanced at any given moment in time to keep a system frequency as close as possible to its reference value (e.g. 50 Hz in Europe and 60 Hz in the USA) and thereby guarantee the stability of the grid. When production exceeds consumption the system frequency goes up and when consumption exceeds production the system frequency goes down. The voltage drop or rise must be kept within a certain range (e.g. ±5 or 10%) because the end users electrical devices are designed for a certain voltage and/or frequency range defined by norms.

Traditionally, energy production has been centralized and tightly managed by a utility. A public utility (usually just utility) is an organization that maintains the infrastructure for a public service (often also providing a service using that infrastructure).

Transmission system operators of a utility are the responsible entities to regulate the system frequency in real time. To this end, they acquire a certain amount of balancing reserves on the ancillary service markets. Nowadays, these reserves are typically provided by large and medium sized generation units and loads.

As more and more distributed and intermittent energy resources are traded and fed into the grid, ensuring grid stability becomes a major concern. Since these additional resources are typically much smaller in size, it is difficult to monitor their real contribution to system frequency or any other grid support services. The lack of monitoring creates a large "shadow load" that utilities cannot see but affects their operations to the point where grid stability is in danger. The utilities might be forced more frequently to request certain producers and/or consumers to stop their activity.

Moreover, the current centralized management approach will not be able to handle an increasingly large number of flexible resources. For instance, the proliferation of electric vehicles (electric cares, e-bikes, e-scooter) on the one hand and devices producing (e.g., solar PV panels) and storing (e.g. Li-ion batteries) energy on the other hand may make it hard if not impossible for the grid operator to control all involved parties effectively.

Currently, this problem is managed by letting small units access the markets via an aggregator, which usually reduces certain risks of not being able to supply contracted reserves by over-dimensioning the pool of distributed energy resources. While this intermediate layer may mitigate some of the above mentioned problems, it does not guarantee that grid stability can be ensured when the number of distributed resources continues to grow.

SUMMARY

It is an objective of embodiments to provide a method and system that mitigates the above mentioned problems. It is a further object of embodiments to guarantee grid stability even when the number of distributed resources continuous to grow by providing a new method that can preferably be implemented in a novel system. In particular, a new method is provided that allows parties to upload data and allows other parties to provide solutions for the data.

The object is achieved by the features of the independent claims. Further preferred embodiments are defined in the dependent claims.

According to embodiments, a decentralized coordination is provided which provides certain advantages over the known centralized coordination of the present utilities. Preferably, the novel decentralized approach uses a distributed ledger in combination with smart contracts to ensure grid stability even in case of a large number of distributed resources are connected to the grid for contribution and/or consumption. The method can preferably be used without complex adaptations in a continuous grow of the number of resources. More particularly, according to a preferred embodiment, the distributed ledger is realized as a blockchain-based mechanism for enhancing the grid stability. Exemplary advantages of such a blockchain-based approach are briefly summarized as follows.

The blockchain decentralizes trust and enables direct and transparent interactions and preferably supports and automates the control flow. Specifically, when grid constraints are implemented in so-called smart contracts, which are pieces of code that are executed on the blockchain, grid stability can be ensured in a distributed and preferably automated manner. According to embodiments, the following aspects are preferable.

According to a first aspect, smart contracts are set up, e.g., based on results of bids and/or bilateral contracts, and preferably updated automatically with parameters that ensure grid stability given the current system and component status.

According to a further aspect, smart contracts can incentivize production and/or consumption as defined in the smart contracts by incorporating tokens for deviations directly in the smart contracts. For instance, digital tokens can be added or deducted to/from individual or each of the plurality of distributed energy resources. According to a preferred embodiment, a higher number of tokens may provide prioritized handling over an energy resource with lower number of tokens.

This approach is vastly different from anything done in the prior art. In particular, embodiments provide a new combination of using blockchain technology for a fully automated and decentralized grid stability mechanism, which is in distinct contrast to the prior art centralized stability control models. Such a decentralized mechanism is specifically advantageous for the predicted growth of distributed resources which are difficult to handle by centralized models. Embodiments also provide the following additional preferred advantages or benefits.

The new approach can be implemented in some of known products or new products to ensure grid stability. A ledger of all transactions performed is preferably publicly available, which favors transparency, equality of opportunity and/or accountability. Preferably, a distributed ledger (also called a shared ledger or distributed ledger technology or DLT) is used, which is typically know as a consensus of replicated, shared, and synchronized digital data geographically spread across multiple sites, countries, or institutions. There is no central administrator or centralized data storage. This provides, i.a., the preferred advantage that minimal communication network infrastructure is required. For instance, data can be sent over any network, including insecure ones, as the ledger records are signed and can be encrypted.

The ledger is preferably available on several devices of the infrastructure, which improves reliability as the infrastructure can seamlessly support failures and communication errors. The grid stability is maintained in an automated fashion such that additional work from any operators is reduced, minimized or even not necessary. The history for each transaction can be easily collected by the utility or the service provider, which further enhances traceability and security. This approach further supports fast execution and automatic response which further enhance grid stability.

In particular, the present disclosure relates to a method for ensuring grid stability by using a distributed ledger, wherein the method comprises the following steps. Metrics from a plurality of distributed energy resources, DERs, are measured wherein said metrics are related to grid stability, such as voltage and/or frequency. Said metrics or measurements or parts thereof are stored in the distributed ledger. Moreover, said metrics are transferred from the distributed ledger into a contract or smart contract. Next, any deviations between said metrics and predetermined values stored in advance in the smart contract(s) are computed by executing the smart contract(s) and the results from the computing step are transferred to the distributed ledger and preferably stored therein. Moreover said results are preferably transferred from the distributed ledger to the respective DER of the plurality of DERs, wherein said DER receives positive and/or negative values (in the following also called tokens) which regulates the amount of contribution and/or consumption to/from the grid to ensure grid stability.

In other words, based on the computed deviations between the measured (actual) metrics and the predetermined values, e.g, promised production value and/or promised consumption value vis-à-vis the actual production value or actual consumption value, respectively, tokens can be calculated. These tokens are signals which quantitatively indicate how an actual production should be enhanced, maintained or reduced. The same is true for the consumption, i.e., the tokens are a kind of quantitative signal how the actual consumption should be enhanced, maintained or reduced. By adapting or adjusting the actual consumption and/or production of the individual DERs, the grid stability can be enhanced. Accordingly, the stability of the frequency of the grid, the inline loading of the grid and/or upper and lower voltage limits of the grid can be enhanced.

For instance, power deviation(s) from a reference can be calculated, which may form the basis for the subsequent method steps. Preferably, the method of the present disclosure translates or transforms such power deviations into an indication about stability level (e.g. voltage, frequency). Such a translation/transformation may be estimated by a plurality of different methods and models and embodiments are not restricted to any particular method or model. As a mere example, a linear model may be used, wherein some linear coefficients may be predetermined, fixed or tuned dynamically. Since a plurality, most or even all of the method steps of embodiments are implemented automatically, the adjusting of the tokens and the subsequent adjustment of the consumption/production of the individual energy resources of the DER runs fast and much faster compared to traditional energy trading methods, which enhances grid stability.

It is preferred that the measuring of metrics is performed by each DER itself or one or a plurality of additional sensor associated with each DER. For instance, the measuring may be executed according to a predetermined schedule, periodically and/or dependent on the measured value with regard to certain thresholds. According to a further preferred embodiment, the measuring step may trigger the subsequent storing step.

It is further preferred that identical copies of the distributed ledger are provided on a plurality of hosts on a peer-to-peer network, wherein the distributed ledger is preferably a blockchain.

Embodiments provide certain advantages over a centralized method, e.g., for small DERs which have a capacity of less than 100 megawatts, preferably less than 50 megawatt and more preferably less than 10 megawatt and even less than 1 megawatt, which can be easily integrated in the method of the present disclosure.

The DERs may comprise multiple generation/contribution and/or storage/consumption components and preferably use at least one renewable energy source from the group consisting of small hydro, biomass, biogas, solar power, wind power and geothermal power. Preferably, each DER contributes to a grid of a present utility.

According to embodiments it is preferred to add new DERs by storing new requirements and/or measurements within the distributed ledger and/or the smart contract or a new smart contract. In particular, a smart contract is preferably a computer program or transaction protocol which is intended to automatically execute, control and/or document legally relevant events and actions according to the terms of a contract or an agreement. The objectives of smart contracts are, for example, the reduction of need in trusted intermediators, arbitrations and enforcement costs, fraud losses, as well as the reduction of malicious and accidental exceptions. According to embodiments, the use of smart contracts provides, for example, the advantage that actions for the plurality of distributed energy resources are handled or executed automatically. For instance, the computing of the above mentioned deviations between predetermined values and actual measured values is computed automatically and also subsequent steps can be executed automatically under the control of the smart contract.

The information about deviations is preferably available to all parties, so an automatic reaction can be triggered. For instance, a unit/party that is not producing/consuming enough (under-production/consumption) can automatically increase production/consumption upon getting the information about the deviation, either by actively querying the status in the distributed ledger (polling) and/or through a message that is sent from a smart contract (event-based detection). Naturally, the same applies to over-production/consumption.

Moreover, the deviation in generation/demand can be directly linked to frequency and/or voltage deviation, e.g. through some linear droops. The reaction is preferably automatically, since response is preferably required shortly after disturbance. It can be based on local action (polling) or received as deviation or direct production/consumption setpoint.

It is also preferred to measure metrics of the entire grid, wherein said metrics are preferably related to grid stability.

For instance, one metric is the voltage of the grid and one metric is the frequency of the grid, wherein increasing frequency is an indication for increasing consumption and decreasing frequency is an indication of increasing consumption.

The present disclosure also relates to a system which is configured to perform the above discussed method steps by appropriate means which are configured to execute the respective method steps. Moreover, the present disclosure also relates to a computer program comprising instructions to cause the system of the present invention to execute the discussed method steps.

BRIEF DESCRIPTION OF THE DRAWINGS

The subject-matter will be explained in more detail with reference to a preferred exemplary embodiment which is illustrated in the attached drawing.

DETAILED DESCRIPTION OF EMBODIMENTS

Figure 1:
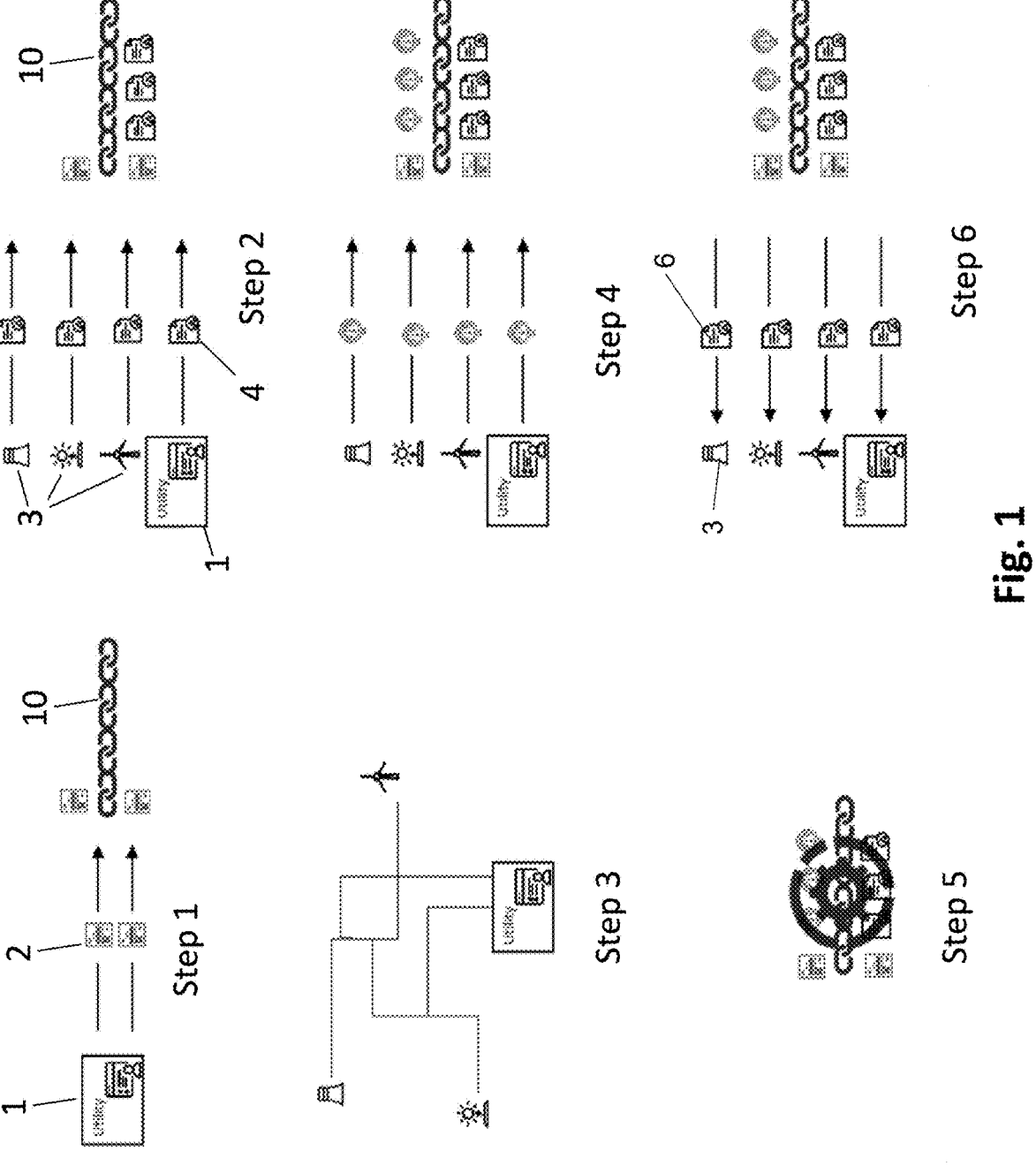
FIG. 1 schematically shows individual steps of a first embodiment.

An exemplary embodiment will be described with reference to FIG. 1 in which identical or similar reference signs designate identical or similar elements.

In order to ensure that the local voltages and/or the system frequency (as a global measure of stability) are within acceptable bounds, utilities typically rely on large generators, tap changers and/or static and dynamic reactive power control devices. The present disclosure provides a method and system how this task can be carried out automatically in the presence of a large number of small energy sources/resources. For instance, it is preferred that an embodiment is used with more than 1000 (small) energy sources. Embodiments, however, are not restricted to any number and any size of the energy source. In other words, embodiments can be implemented with any size and any number of energy sources. The advantages of the decentralized method show up more clearly for larger amount of energy sources, which are more difficult to handle centralized.

One preferred setup can be described as follows. Manufacturer of utility devices and/or their utility customers—and potentially additional parties—provide dedicated hardware to host and run nodes of a shared blockchain (distributed ledger). Multiple parties are involved in this step, as this enables the "distribution of trust" to many entities. In this exemplary setup, any attempts by a single party or a small number of colluding parties to manipulate the system will be thwarted, i.e., the distributed execution of the blockchain ensures correctness and consistency.

Conventional power stations, such as coal-fired, gas, and nuclear powered plants, as well as hydroelectric dams and large-scale solar power stations are centralized and often require electric energy to be transmitted over long distances.

By contrast, "distributed energy resource" (DER) systems are decentralized, modular, and more flexible technologies, that are located close to the load they serve, albeit having often capacities of only 10 megawatts (MW) or less. These systems can comprise multiple generation and storage components; in such an instance they are often referred to as hybrid power systems.

The parties mainly involved in the scenario of the present disclosure are preferably the owners of the following devices: consumer devices; producer devices; energy storage devices; active grid devices (e.g. tap changers, capacitor banks, FACTS devices (flexible alternating current transmission system), etc.), certified measurement devices (e.g. meters, gird sensors and instruments) without being limited to said exemplary list of devices.

The first three types of consumer, producer and energy storage devices are examples of "distributed energy resource" (DER). If a new DER is to be set up, a smart contract 2 between the utility 1 and the operator of the DER is created. In this contract 2, the terms with respect to grid stability are preferably captured precisely, e.g., volume of energy produced and consumed, timing, and preferably also penalties for deviations. This contract 1 is transferred and hosted on the blockchain 10 (see step 1 in FIG. 1). Hence, in a first step, basic smart contracts are added to the blockchain. Moreover, the DERs are preferably equipped with certified sensors and/or counters that reliably measure metrics that can be used for determining grid stability.

During operation, these sensors and/or counters of the DERs 3 periodically send their measurements 4 to the blockchain 10, where they are preferably stored immutably. In addition, it is further preferred that the utility 1 publishes the current conditions and grid constraints on the blockchain 10 (step 2 in FIG. 1). For instance, periodic condition measurements for each DER and grid conditions and/or constraints may be stored. Moreover, it is also possible to mitigate the growth of the blockchain data by introducing "milestones", where older data is removed and potentially archived. Preferably only data starting with an agreed upon milestone is stored in the blockchain. Alternatively or additionally, certain data could be stored off-chain, i.e., the blockchain only stored hashes and/or pointers to the data items. In such a solution, however, it is necessary to ensure the availability of the off-chain data.

According to a preferred embodiment, at least one of following information is stored on the blockchain 10.

i) At System Start-Up:

Smart contracts 2 that preferably compute in a time-triggered manner, or when a set of new profiles is added to the blockchain 10, the next commands for the involved devices 3 (this can include a schedule for prosumers, tap positions, voltage and current bounds), and sends them to the involved devices 3.

Smart contracts 10 that verify if the devices 3 follow the schedules and commands and trigger penalty/rewarding evaluation accordingly, executed automatically when new measurements are added to the blockchain 10.

ii) Whenever New Devices Enter the System or when their Profiles Change:

Device 3 profiles preferably describes the capacity for reserves (e.g., 10% of capacity for reserves); estimated power (e.g., consumption and production) profile for time intervals (e.g., in the next two hours or next 10 minutes); flexibilities (e.g., a water boiler can start a bit earlier or later or heat up the water more quickly or slowly) and/or a certified measurement setup in order to verify that the device 3 produces valid measurements and to associate the certified meters with the right devices.

iii) Whenever New Measurements are Available:

The certified measurement devices store their measurements in the blockchain (see step 4 in FIG. 1).

Consequently, the scheduling part of grid stability can be improved and automated: The protocol-driven distributed ledger (blockchain 10) thus provides an automated mechanism to ensure grid stability in the face of numerous energy producers, storage, and consumers by a) specifying the current conditions for production and consumption automatically and b) incentivizing adherence to these conditions by incorporating automatic benefits or penalties depending on the magnitude of the deviation using smart contracts 3.

As indicated in step 6 of FIG. 1, tokens 6 can be transferred internally to the DER 3 as a result of the smart contract execution.

Figure 2:
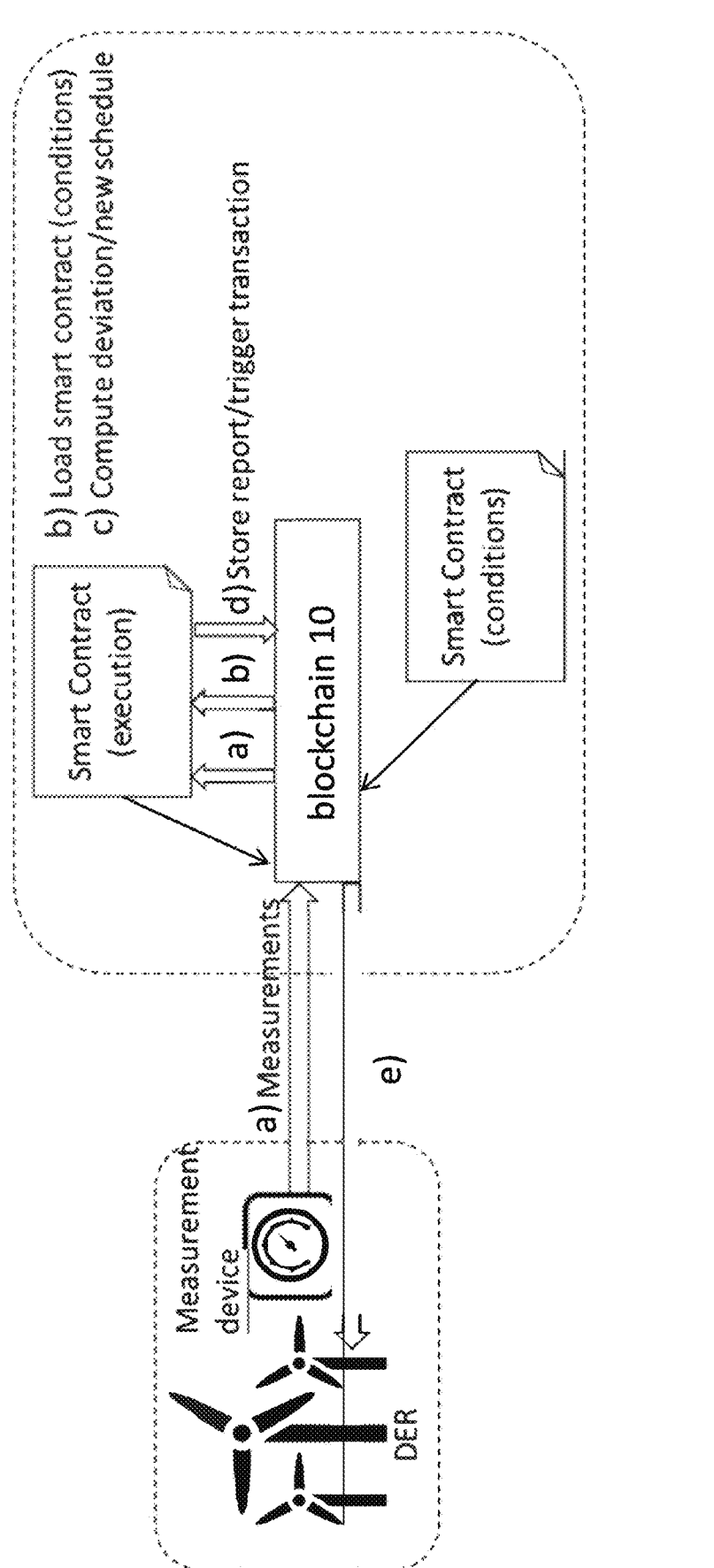
FIG. 2 schematically shows steps between a DER and the blockchain.

FIG. 2 shows the basic steps of a preferred method according to an embodiment.

In step a), measurements from DER, which are preferably obtained by additional measurement devices at the DER, are transferred and stored in the blockchain 10. According to a preferred embodiment, such a storing step is executed on the basis of a predetermined schedule and/or periodically. Preferably, said step causes that the conditions from the DER are transferred to the smart contract (see a) in FIG. 2). For instance, the smart contract is triggered by the new values and loads the corresponding DER's conditions/measurements from the blockchain (see step b) in FIG. 2).

Next, the smart contract is used for evaluation and/or computing any deviation(s) from the conditions stored in the initial smart contract (see step c) in FIG. 2). Additionally or alternatively, the method can also handle situations when grid conditions change. For instance, the production and/or consumption of individual DERs might be adapted accordingly. The periodically/dynamically changing plan when to produce/consume energy for a DER is called a "schedule". Thus, in case grid conditions change, a new schedule can be generated.

Next, in step d), the result of said computing step is stored in the blockchain 10. Said results are subsequently transferred to the DER in step e). For instance the results can be retrieved by the DER 5) or pushed from the blockchain to the DER. This step e) may include the automatic execution of a transaction evaluation, e.g., bonus or penalty tokens which can be used for the evaluation of service quality.

The invention claimed is:

1. A method for facilitating grid stability of a grid by using a distributed ledger, the method comprising:

determining metrics from each of a plurality of distributed energy resources (DERs), wherein said metrics are related to grid stability;

storing said metrics in the distributed ledger; and for each respective DER of the plurality of DERS, automatically triggering a smart contract for the respective DER by transferring said metrics for the respective DER from the distributed ledger into the smart contract, wherein tokens for deviations are incorporated directly into the smart contract, executing the smart contract to compute any deviations between said metrics and predetermined values in a schedule for the respective DER, transfer and store results from the computation in the distributed ledger, and transfer positive or negative tokens to the respective DER according to a magnitude of the deviation, wherein the tokens are signals which quantitatively indicate how consumption or production should be enhanced, maintained, or reduced, and by the respective DER, adapting or adjusting consumption or production of the respective DER based on the transferred positive or negative tokens, to thereby regulate the amount of contribution/consumption to/from the grid to facilitate grid stability.

2. The method of claim 1, wherein said determining of metrics is performed by each respective DER itself or one or a plurality of sensors associated with each respective DER.

3. The method of claim 1, wherein said determining is executed according to:

i) a predetermined schedule;

ii) periodically; and/or iii) a value of the determined metric with regard to one or more thresholds.

4. The method of claim 1, wherein said determining triggers the storing of said metrics in the distributed ledger.

5. The method of claim 1, wherein identical copies of the distributed ledger are provided on a plurality of hosts on a peer-to-peer network.

6. The method of claim 1, wherein the distributed ledger is a blockchain.

7. The method of claim 1, wherein each of the plurality of DERs has a capacity of less than 100 megawatts, preferably less than 50 megawatt and more preferably less than 10 megawatt and even less than 1 megawatt.

8. The method of claim 1, wherein each of the plurality of DERs comprises multiple generation/contribution and/or storage/consumption components and preferably uses at least one renewable energy source from the group consisting of small hydro, biomass, biogas, solar power, wind power, and geothermal power.

9. The method of claim 1, wherein each DER contributes to a grid of a present utility.

10. The method of claim 1, wherein new DERs are added to the plurality of DERs by storing a new smart contract in the distributed ledger.

11. The method of claim 1, further comprising determining metrics of the entire grid, wherein said metrics are related to grid stability.

12. The method of claim 1, wherein one metric is the voltage of the grid and/or one metric is the frequency of the grid.

13. A system for facilitating grid stability by using a distributed ledger, the system comprising at least one processor configured to perform the method of claim 1.

14. A non-transitory computer-readable medium having a computer program stored thereon, wherein the computer program, when executed by a processor, causes the processor to perform the method of claim 1.

15. The method of claim 12, wherein increasing frequency is an indication for decreasing consumption and decreasing frequency is an indication of increasing consumption.

16. The method of claim 1, wherein a number of the plurality of DERs is at least one thousand.

* * * * *